Oct. 21, 1930.  S. L. HANDFORTH  1,779,232
CHEMICAL APPARATUS
Filed June 29, 1929
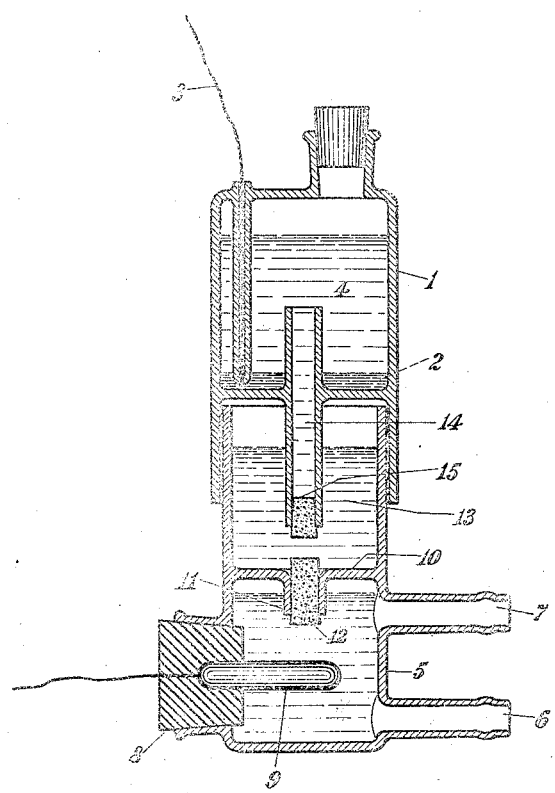
Inventor
S. L. Handforth
By his attorney.

Patented Oct. 21, 1930

1,779,232

UNITED STATES PATENT OFFICE

STANLEY L. HANDFORTH, OF WOODBURY, NEW JERSEY, ASSIGNOR TO E. I. DU PONT DE NEMOURS & COMPANY, OF WILMINGTON, DELAWARE, A CORPORATION OF DELAWARE

CHEMICAL APPARATUS

Application filed June 29, 1929. Serial No. 374,914.

This invention relates to an apparatus for determining the electromotive force developed between an electrode and a solution, and more particularly to an apparatus for determining the hydrogen ion concentration of solutions.

As is well known, the hydrogen ion concentration of a solution is the measure of the acidity or alkalinity of that solution. If an electrode made of platinum, covered with platinum black and surrounded by an atmosphere of hydrogen is dipped into an acid or alkaline solution, the electromotive force developed between the solution and the electrode will be proportional to its hydrogen ion concentration. Electrodes for this and other purposes have been developed.

Under certain conditions tungsten will develop an electromotive force which depends on the hydrogen ion concentration. Antimony or antimony coated with antimony oxide will also develop an electromotive force which depends on the hydrogen ion concentration. The oxidation or reduction potential of a solution may also be determined in a similar manner by using a suitable electrode. In order to properly complete the circuit so as to measure the electromotive force, it is necessary to have the solution electrically in contact with another electrode of known and fixed electromotive force or so-called half cell. The calomel cell has been more or less satisfactory for this purpose. This consists of an electrode of mercury covered by a solution saturated with mercurous chloride (calomel) and containing a definite concentration of potassium chloride. It is necessary to make a liquid electrical contact with this solution and the solution, the electromotive force of which is being measured.

At the same time it is imperative that foreign material be prevented from getting into the calomel cell. This has been accomplished in general by placing a cell containing a potassium chloride solution between the calomel cell and the solution which is to be measured and connecting the three by means of capillaries, ground glass joints or porous cups and replacing the solution in the middle or bridge cell sufficiently often enough to prevent contamination of the calomel cell. Heretofore this has required an apparatus which is difficult to use in plant operation and which requires frequent attention to keep in order.

The present invention has as an object an improved type of combined cell suitable for plant use. A still further object of my invention is the construction separately of the three compartments of the combined cell in such a way that the danger of contamination is at a minimum and so that the cell will require a minimum of attention. Other objects will appear as the description proceeds.

These objects are accomplished by providing a combined cell which contains a standard calomel cell, a bridge cell, and a cell containing the electrode and thru which the solution may flow. Preferably, I construct the three cells separately and provide the electrical bridge between the cells. Furthermore, according to my invention I provide a small compartment through which the liquor to be tested may flow and into which the desired electrode is inserted. Through one wall of this cell there is a tubular opening into which an unglazed or porous porcelain plug is sealed. For this purpose also porous sintered glass or like material may be used. One end of the plug dips into the solution to be tested, the other into a potassium chloride solution in the adjoining compartment. A similar plug, sealed or fused into an opening in a calomel cell also dips into this solution. These plugs being only slightly porous, resist diffusion and the salt solution in the separating cell can be renewed often enough to prevent the solution in the calomel cell from being contaminated by material from the solution being tested. These plugs, while being impervious enough and small enough to resist diffusion, still absorb enough electrolyte to form a satisfactory electrical path.

These principles of construction are embodied in the apparatus shown in the accompanying drawing, but it is to be understood that other embodiments exist and may be practiced within the scope of my invention. The single figure of the drawing is a sectional view of one embodiment of my invention in which 1 is the calomel cell containing the mercury 2 to which electrical contact is made by means of the wire 3.

The solution 4 above the mercury contains an excess of solid mercurous chloride (calomel) and the desired concentration of potassium chloride. Compartment 5 through which the liquid to be measured flows, has a liquid inlet 6 and outlet 7, and an opening 8 through which the electrode 9 is inserted. Partition 10 forms the upper wall of this compartment through which there is tubular opening 11 in which is sealed or fused the small porcelain or porous plug 12. Compartment 13 is formed by the extension of the side walls of this cell to a sufficient height. The side walls of the calomel cell 1 are extended so as to fit over or into this cell and form the cover of it. The tubular connections 14 in the calomel cell makes connection with the liquor above the mercury and the lower end of it, into which is sealed or fused the porcelain or porous plug 15, which dips into the potassium chloride solution in 13 and makes the necessary salt bridge between the compartments.

It will be apparent that it is within the scope of my invention to modify the construction described above. For example, the combination may be constructed as one piece, and one or more additional openings provided in the intermediate cell for filling and emptying the cell. Other obvious modifications within the scope of my invention will suggest themselves from the foregoing disclosure to one skilled in the art.

One of the principal advantages of the improved combination comprising my invention is that the small porous plugs afford an efficient electrical path of comparatively low resistance. By means of these plugs diffusion is at a minimum, and furthermore little attention is required in the operation of the apparatus. For example, it is possible to operate this cell for extended periods of time without its being necessary to renew the solutions for the purpose of avoiding contamination.

While I have described my apparatus as particularly applicable to the determination of hydrogen ion concentration of solutions, it will be apparent that it is equally applicable to other electromotive force determinations where a standard half cell, such as a calomel cell, is employed in contact with another solution, such as is the practice in oxidation and reduction potential determinations and the like. It will also be apparent that it is within the purview of my invention to adopt other types of standard half cell or electrode in my combination, in which case the corresponding solution in the intermediate cell would be changed accordingly.

As many apparently widely different embodiments of this invention may be made without departing from the spirit thereof, it is to be understood that I do not limit myself to the foregoing examples or descriptions except as indicated in the following patent claims.

I claim:

1. An electrode vessel comprising in combination a reference cell, a common salt cell, and porous plugs connecting electrolytically the reference cell and the common salt cell.

2. The invention of claim 1 in which the porous plugs are sealed into openings in the cell walls.

3. The invention of claim 1 in which the porous plugs are fused into openings in the cell walls.

4. In an apparatus for determining the electromotive force developed between a solution to be tested and an electrode, in combination, a vessel containing the said solution and electrode, a standard half cell or electrode of known electromotive force, and a salt solution, all interposed between said vessel and said half cell, and porous plugs connecting the salt solution cell and the vessel and half cell.

5. The invention of claim 4 in which one of the porous plugs is sealed into the partition between the sale solution cell and the reference cell and another is sealed into the partition between the salt solution cell and the standard half cell.

6. The invention of claim 4 in which one of the porous plugs is fused into the partition between the salt solution cell and the reference cell and another is fused into the partition between the salt solution cell and the standard half cell.

7. In an apparatus for determining the electromotive force developed between a solution to be tested and an electrode, in combination, a vessel containing the said solution and electrode, a standard half cell or electrode of known electromotive force, and a salt solution, all interposed between said vessel and said half cell, tubular connections closed by means of a porous diaphragm between the salt solution cell and the vessel and half cell.

8. The invention of claim 7 in which porous plugs are sealed in the tubular connections.

9. The invention of claim 7 in which porous plugs are fused in the tubular connections.

In testimony whereof, I affix my signature.

STANLEY L. HANDFORTH.